March 25, 1969  R. J. FOGLE  3,434,772
STEREOSCOPIC AND MICROSCOPIC BINOCULAR
Filed Oct. 10, 1966  Sheet 1 of 2
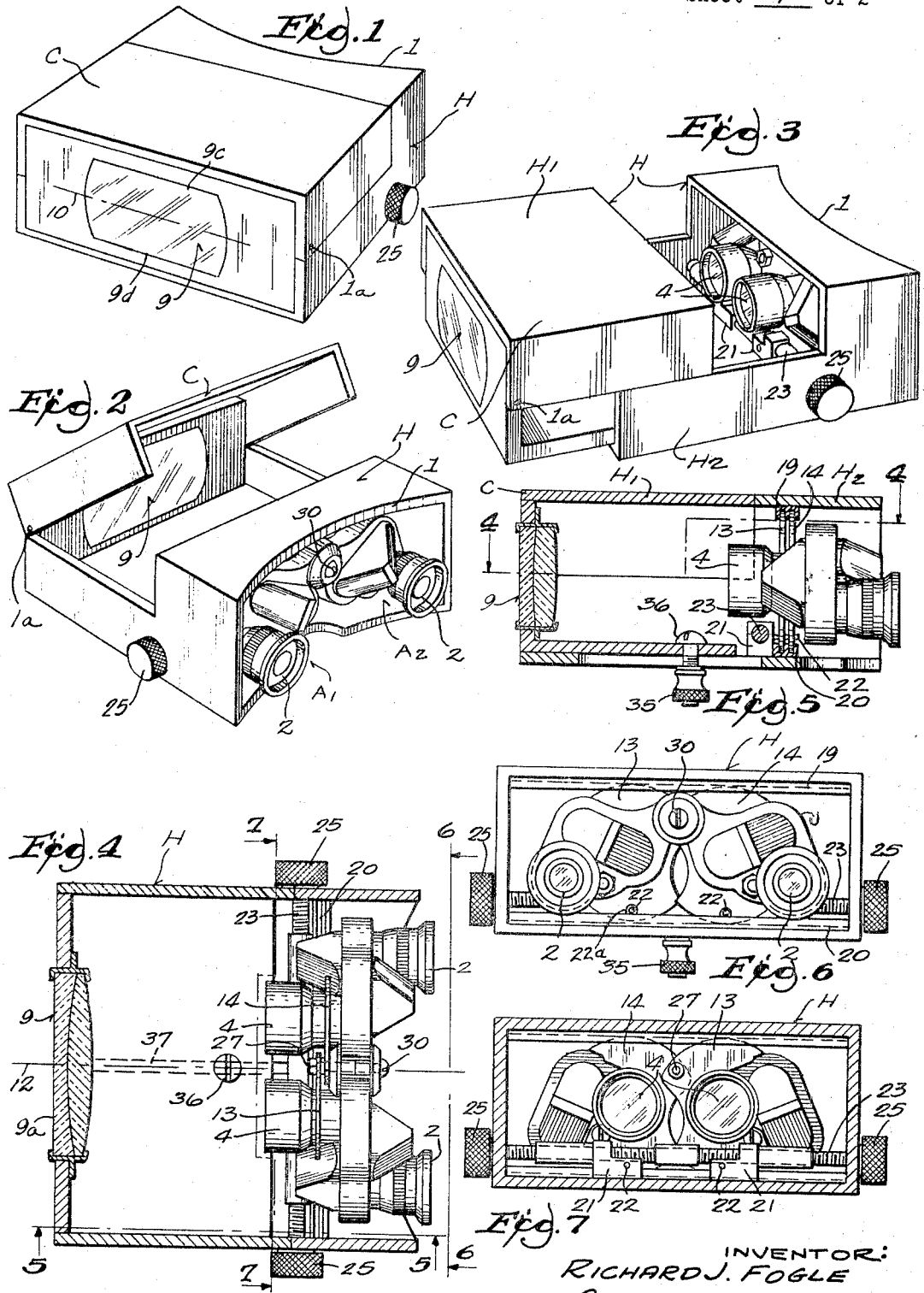
INVENTOR:
RICHARD J. FOGLE
BY: James E. Nilles
ATTORNEY

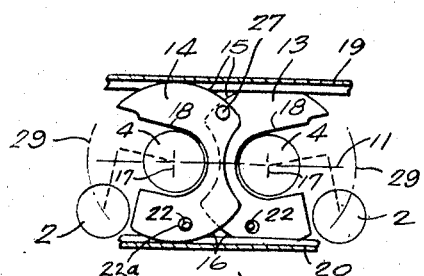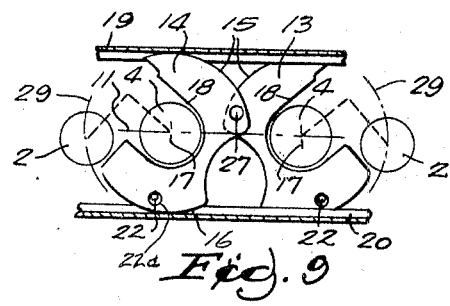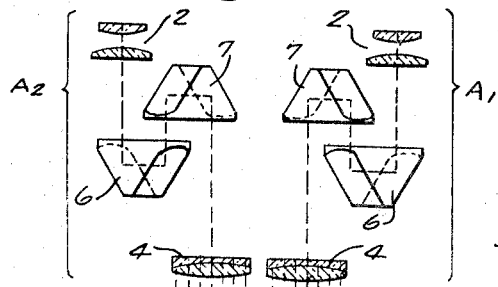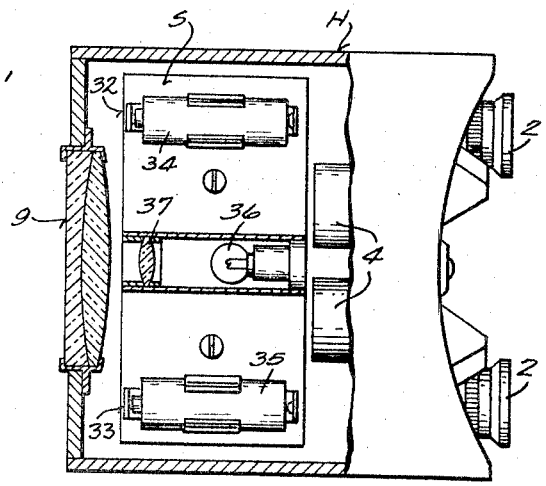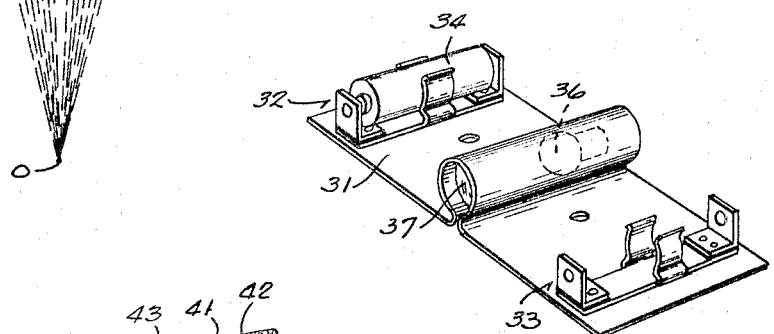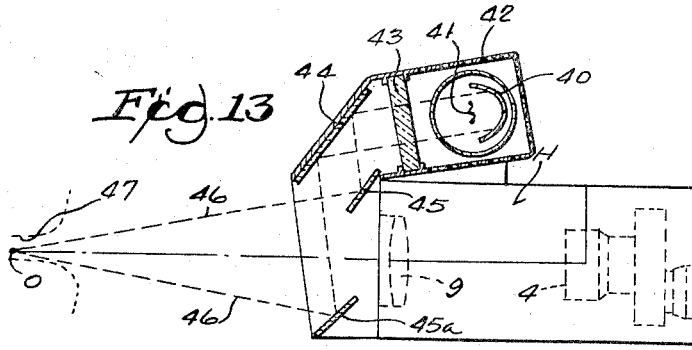
INVENTOR:
RICHARD J. FOGLE
BY: James E. Nilles
ATTORNEY

United States Patent Office

3,434,772
Patented Mar. 25, 1969

3,434,772
STEREOSCOPIC AND MICROSCOPIC BINOCULAR
Richard J. Fogle, 123 Steeplechase Drive,
Racine, Wis. 53402
Filed Oct. 10, 1966, Ser. No. 585,400
Int. Cl. G02b 21/22
U.S. Cl. 350—35                                16 Claims

ABSTRACT OF THE DISCLOSURE

A stereoscopic viewer having a pair of erecting prismatic assemblies wherein the intermediate objectives move laterally in a straight line simultaneously with the adjustment of the eyepieces to maintain the line of sight and to accommodate the interpupillary distance of the observer's eyes, respectively.

---

This invention relates generally to optical instruments and in particular to an improved stereoscopic, microscopic binocular for magnification of a particularly small area at very close proximity to the observer.

The invention finds particular but not exclusive utility, in use by doctors in observing and operating in extremely small areas of the patient, such as in an inner ear passage. Other examples of uses where the invention finds exceptional utility, for example, are in watch repairing or in precision and intricate machine work where high magnification at very close proximity is required.

In accordance with the present invention, there is provided a practical binocular of the above type which has adjustment means for varying the lateral distance between two erecting prismatic assemblies in order to accommodate the interpupillary distance of the observer. These assemblies each have a rear eyepiece and an intermediate objective lens with two prisms therebetween. The intermediate objective lenses are located laterally within the distance between the eyepieces. The binocular also has a front objective lens located in front of two laterally adjustable intermediate objective lenses in order also to convert the light rays, at a point in very close proximity to the observer, into parallel rays for transmission into the intermediate objective lenses, thereby permitting magnified inspection of a point which is in very close proximity to the observer.

A more specific aspect of the invention also contemplates novel means for mounting the said pair of erecting prismatic assemblies for lateral adjustment but which maintains the laterally movable intermediate objective lenses in alignment with the single front objective lens. Stated otherwise, the novel mounting means restricts the movement of the intermediate objective lenses to a straight line, which line is aligned with the major axis of the front objective lens.

This arrangement provided by the present invention results in a compact, versatile, stereoscopic and microscopic binocular utilizing a relatively small front objective lens, for magnified inspection of very small particles at particularly close proximity to the observer.

A more specific object of the invention is to provide a binocular assembly of the above type in which the single, front objective lens is of the plano-convex type located in front of the two laterally movable prismatic assemblies for continuous cooperation with both; novel mounting means are provided for the two shiftable erecting prismatic assemblies so that the intermediate objective lens of each of the two assemblies move laterally in a straight line and are maintained in alignment with the front objective lens; at the same time the mounting means permits the compound movement of the eyepieces for adjustment to accommodate the observer's interpupillary spacing.

Another more specific aspect of the invention relates to such an assembly also having a light source which is accurately directed into the precise area of observation.

These and other objects and advantages of the present invention will appear hereinafter as this disclosure progresses, reference being had to the accompanying drawings, in which:

FIGURE 1 is a perspective view of a binocular made in accordance with the present invention, the view being taken generally from the front upper end thereof;

FIGURE 2 is another perspective view of the binocular, the view being taken generally from the rear upper end thereof;

FIGURE 3 is a perspective view of the binocular showing the housing when telescoped to the open position;

FIGURE 4 is a plan view of the binocular, in section;

FIGURE 5 is a side elevational view taken along line 5—5 in FIGURE 4;

FIGURE 6 is an end elevational view taken along line 6—6 in FIGURE 4;

FIGURE 7 is an elevational view in section taken along line 7—7 in FIGURE 4;

FIGURE 8 is a fragmentary, diagrammatic view of a portion of the binoculars and showing the relative positions of the intermediate objective lenses and the eyepieces in one adjusted position;

FIGURE 9 is a view similar to FIGURE 8 but showing the eyepieces and the intermediate objective lenses when moved to a different position;

FIGURE 10 is a schematic, plan view of the lens arrangement of the binoculars;

FIGURE 11 is a view similar to FIGURE 4, but being only partially in section, and showing the light means inserted in the housing;

FIGURE 12 is a perspective view of the light means shown in FIGURE 11; and

FIGURE 13 is a side elevational view of the binocular which utilizes another form of light means.

Referring in greater detail to the drawings, the binocular includes a housing H which is generally rectangular in shape, although of course other configurations could be used, and at one end the housing is curved, as at 1, so as to generally fit the contour of the observer's face. The housing includes a cover C pivoted at 1a, which can be swung to an open position as shown in FIGURE 2. The housing includes the front part H1 and rear part H2, which telescope relative to one another, as will more fully appear later. During the description of the invention, the viewer's end of the housing will be referred to as the rear end, while the opposite end of the housing will be referred to as the front end. This terminology is for the purpose of convenience only in describing the invention and should not be interpreted as otherwise limiting the scope of the invention.

Erecting prismatic assemblies

A pair of erecting prismatic assemblies A1 and A2 are mounted in said housing adjacent the rear end thereof, and for shifting movement within the housing in a transverse, lateral direction in respect to the front and rear ends of the housing. Each of the assemblies include a frame J in which is mounted an eyepiece 2 at the rear end of the frame, and intermediate objective lens 4 at the other end, and intermediate prisms 6 and 7 located between the eyepiece and the intermediate objective lens. The path of the image through the assemblies is shown in dotted lines in FIGURE 10.

It should be noted that the arrangement so far described is such that the intermediate objective lenses 4 are located close together and laterally within the distance between the eyepieces 2.

It will be noted that the eyepieces 2 of the assemblies A1 and A2 extend slightly beyond the rear end of the housing and these are laterally adjustable, as will appear, to accommodate the interpupillary distance of the observer's eyes. As far as these eyepieces are concerned, it is not essential that they move in a straight line toward and away from another, but instead they move with a compound movement, generally of elliptical nature.

Front objective lens

A single, front, objective lens 9 is located adjacent the front end of the housing and is of the planto-convex type wherein the plano surface 9a is located away from the erecting prismatic assemblies, that is to say the plano surface is on the front side of the binocular. As shown in FIGURE 10 this front lens 9 serves to transmit the light rays which are received at an angle from the object O to be viewed, in parallelism back to the intermediate objective lenses 4 of the erecting prismatic assemblies A1 and A2.

It will be noted that the front objective lens 9 is generally flat on its top and bottom sides 9c and 9d as viewed generally from the front (FIGURE 1), and this is possible because only a portion of the front objective lens is necessary with this invention, as will appear. The major diameter of the front lens has been indicated by the line 10 in FIGURE 1, and the generally lateral adjustment of the erecting prismatic assemblies, to be described, is such that the intermediate objective lenses 4 move in a straight line (FIGURES 7, 8 and 9) and in alignment with the major axis 10 of the front objective lens 9.

Thus as will more fully appear, the front objective lens is fixed as to its lateral position, while the intermediate objective lenses 4 of the erecting prismatic assemblies A1 and A2 are laterally adjustable so as to accommodate the interpupillary distance between the observer's eyes, but nevertheless the intermediate objective lenses 4 are always in alignment with and cooperate with the front objective lens 9, because of the novel means for mounting the erecting prismatic assemblies A1 and A2, now to be referred to.

Mounting means for assemblies

Means are provided for shiftably mounting the assemblies generally relative to one another only in a generally lateral direction, while the intermediate lens 4 thereof move in a straight line indicated by reference number 11. The intermediate objective lenses 4 also move generally symmetrically from the longitudinal center line 12 (FIGURE 4) of the binoculars.

This mounting means comprises a pair of disc or plate-like support members 13 and 14, one for each of the shiftable intermediate objective lenses 4. These support members are formed with arcuate surfaces 15 and 16 (FIGURES 8 and 9) at their upper and lower sides respectively; more specifically, these arcuate surfaces are formed as a radii with the longitudinal center 17 (FIGURE 8) of the opening 18 as a center for these radii. Guide means are provided in the housing against which the arcuate surfaces 15 and 16 abut for shiftable and guiding movement along said guide means, and these guide means take the form of channel tracks 19 and 20 located, respectively, in the upper and lower walls of the housing, adjacent the rear end thereof.

Running nuts 21 are pivotally connected to the lower side of each of the support members 13 and 14 by pins 22 which are fixed to the nuts and extend freely through larger holes 22a, thereby accommodating arcuate movement of the holes and straight line movement of the pins. A threaded rod 23 having a right and left thread, threadably extends through these nuts 21 and terminates on the outside of the housing where a knurled adjusting knob 25 is fixed thereto. Turning of the knob 25 and consequent rotation of the rod 23 causes the nuts 21 to run in opposite directions along the rod, thereby rotating the support members 13 and 14 about the pivotal connection 27 which holds them together. Each of the support members 13 and 14, as previously indicated, has a central opening 18 into which the erecting prismatic assemblies A1 and A2 are mounted about the longitudinal axes of the intermediate objective lenses 4.

Operation

Rotation of the support members 13 and 14, and consequent relative movement away from one another, also carries with them the erecting prismatic assemblies A1 and A2. Because the forward portion of the assemblies (containing the intermediate objective lenses 4) are mounted in the central portion 18 of the support members, up and down movement of these objective lenses 4 is prohibited because the support members are securely held in the guide tracks 19 and 20 and cannot move up and down. The consequent overall movement of the front end of the assemblies, that is the intermediate objective lenses 4, is in a direction only toward and away from another in a lateral direction and along the straight line 11 (FIGURES 7, 8 and 9). The rear end of the assemblies, that is to say the eyepieces 2, also are free to swing about axis 30 and because they are laterally offset in the frame from objective lenses 4 the eyepieces swing, generally in a compound direction, as indicated generally by broken line 29 in FIGURE 8.

It will also be noted that the erecting prismatic assemblies are connected together at the pivotal connection 30, thus assuring symmetrical movement of the erecting prismatic assemblies about the longitudinal center line of the binoculars.

Focusing

Referring now to the front objective lens 9, it will be noted that it is located at a distance forwardly from the erecting prismatic assemblies, more specifically from the front objective lenses 4 thereof, and this distance can be variable, as indicated by the different positions shown in FIGURES 1 and 3. To provide an adjustment of this distance for focusing, if desired, the housing as previously indicated, is made in two parts, a front part H1 which telescopes relative to the housing rear part H2 upon loosening of the threaded knob 35 on the bolt 36 (FIGURE 5) which extends through slot 37 in rear part H2. Other adjusting rollers (not shown) could of course be used for this adjustment, thus adjustably positioning the front objective lens 9 from the erecting prismatic assemblies A1 and A2.

Light source

In view of the nature of the uses in which the present invention finds particular utility, it is often necessary to provide an additional light source, usually of high intensity, for example for inspecting and operating on the inner ear portions of a human being. Such a light must be accurately and precisely directed along the line of sight, because there is no room otherwise for the light beams to enter the area to be viewed.

Accordingly, there is provided a high intensity light source which is precisely directed, and one such source S may be located between the front objective single lens 9 and the erecting prismatic assemblies A1 and A2, as shown in FIGURE 11. The light source S, is formed as an integral package as shown in FIGURE 12, and includes a mounting plate 31 having a pair of clips 32, 33 for holding batteries 34, 35 which furnish energy to a bulb 36 through means (not shown) such as conventional wires and a switch. A magnifying glass 37 may be used, which together with lens 9 magnifies the light source.

An alternate light source S1 (FIGURE 13) can be mounted on top of the housing and includes a parabolic reflector 40, and projection lamp 41, of high intensity. With the latter arrangement, suitable enclosure 42 with a heat absorbing glass 43 is also provided. Mirror 44 and small mirrors 45 and 45A are used to direct the high intensity lamp rays 46 and reflect them from above and below the light path to provide illumination without casting a shadow on the object being viewed, such as an ear canal 47.

Résumé

The stereoscopic, microscopic binocular provided by the present invention utilizes a pair of erecting prismatic assemblies wherein the eyepiece width is greater than the objective lens placement, which permits parallel prism binoculars to fit within the area of a common, front objective lens. The front objective lens is arranged so that the plano side is forward and the convex side faces rearwardly, and this front objective lens can be located any distance from the intermediate lenses without serious distortion of the image. The novel mounting means permits the elliptical movement of the binocular eyepieces to accommodate interpupillary distance and at the same time maintains the alignment of the intermediate lenses with the front objective lens. The improved binocular provided by the invention is particularly compact, lightweight, easily handled and versatile in performing the functions for which it is designed.

Various modes of carrying out the invention are contemplated as being within the scope of the following claims particularly pointing out and distinctly claiming the subject matter which is regarded as the invention.

I claim:

1. Stereoscopic, microscopic binoculars comprising, a pair of erecting prismatic assemblies each having a rear eyepiece adjacent one end thereof, said assemblies having an intermediate objective lens located laterally between said eyepieces, mounting means for shiftably mounting said eyepieces generally laterally relative to one another to accommodate interpupillary spacing and also for shiftably mounting said intermediate objective lenses in a lateral straight-line direction toward and away from one another; and a single front, objective lens adjacent the other end of said assemblies and in constant alignment with said intermediate objective lenses because of said shiftable mounting means and regardless of the adjusted position of the latter for transmitting parallel light rays thereto.

2. A binocular as set forth in claim 1 further characterized in that said mounting means comprises; a pair of support members, one for supporting each of said shiftable, intermediate objective lenses for movement in a substantially straight line and toward and away from one another; and means for adjusting said support members for consequent movement of said shiftable intermediate objective lenses.

3. A binocular as defined in claim 2 further characterized in that said support members have upper and lower arcuate surfaces, and guide means against which said surfaces abut for shiftable and guided movement along said guide means.

4. The binocular described in claim 3 further characterized in that said assemblies have a pivotal connection therebetween, and said support members also have a pivotal connection therebetween.

5. The binocular as set forth in claim 1 including light source means to direct a beam of light directly on an object to be viewed through said binoculars.

6. The binocular as set forth in claim 1 further characterized in that said front objective lens is located a substantial distance from said intermediate objective lenses, and a light source located between said front objective lens and said shiftable intermediate objective lenses for directing a beam of light through said front objective lens for magnification on an object to be viewed by said binoculars.

7. The combination as recited in claim 1 further characterized in that said front objective lens is of the plano-convex type with the plano side positioned away from said pair of shiftable intermediate objective lenses, whereby light rays from an object being observed are directed in parallelism to said pair of shiftable intermediate objective lens of the assemblies.

8. A stereoscopic, microscopic binocular comprising, a two part, telescoping housing adjustable along the optical axis, a pair of erecting prismatic assemblies shiftably mounted in said housing and each assembly having a rear eyepiece adjacent one end of said housing, said assemblies also each having an intermediate objective lens, said intermediate objective lenses in a lateral straight-the distance between said eyepieces, mounting means for shiftably mounting said assemblies generally laterally relative to one another and for also shiftably mounting said intermediate objective lenses in a lateral straight-line direction toward and away from one another; and a single front, objective lens adjacent the other end of said housing and in constant alignment with said intermediate objective lenses because of said shiftable mounting means and regardless of the adjusted position of the latter for transmitting parallel light rays thereto.

9. A binocular according to claim 8 further characterized in that said mounting means comprises; a pair of support members shiftably mounted in said housing, one for supporting each of said shiftable, intermediate objective lenses for movement in a substantially straight line and toward and away from one another; and means on said housing for adjusting said support members for consequent movement of said shiftable intermediate objective lenses.

10. A binocular as defined in claim 9 further characterized in that said support members have upper and lower arcuate surfaces; and upper and lower guide means in said housing and against which said upper and lower surfaces abut, respectively, for shiftable and guided movement along said guide means.

11. The binocular described in claim 10 further characterized in that said assemblies have a pivotal connection therebetween, and said support members also have a pivotal connection therebetween.

12. The binocular as set forth in claim 8 including light source means on said housing and to direct a beam of light directly on and for magnification of an object to be viewed through said binoculars.

13. The binocular as set forth in claim 8 further characterized in that said front objective lens is located a substantial distance from said intermediate objective lenses, and a light source in said housing and located between said front objective lens and said shiftable intermediate objective lenses for directing a beam of light through said front objective lens for magnification on an object to be viewed by said binoculars.

14. The combination as recited in claim 8 further characterized in that said front objective lens is of the plano-convex type with the plano side positioned away from said pair of shiftable intermediate objective lenses, whereby light rays from an object being observed are directed in parallelism to said pair of shiftable intermediate objective lens of the assemblies.

15. The binocular as set forth in claim 8 further characterized in that said mounting means comprises, a pair of support members pivotally mounted together for shifting toward and away from one another; said intermediate lenses being carried by said support members, one in each support member; and guide means in said housing for restricting movement of said support means and the lenses carried thereby to a straight line movement.

16. The binocular described in claim 15 further characterized in that said support members have upper and lower arcuate surfaces, and said guide means includes upper and lower tracks against which said upper and lower arcuate surfaces abut, respectively, for movement therealong.

(References on following page)

References Cited

UNITED STATES PATENTS

| | | | |
|---|---|---|---|
| 828,511 | 8/1906 | Saegmuller | 350—36 X |
| 947,971 | 2/1910 | Konig | 350—75 |
| 1,153,259 | 9/1915 | Saegmuller | 350—36 |
| 1,497,294 | 6/1924 | Erfle | 351—5 |
| 2,463,311 | 3/1949 | Ramsdell | 350—145 |
| 2,503,342 | 4/1950 | Knight | 350—145 |
| 2,988,955 | 6/1961 | Goto et al. | 350—43 X |
| 3,309,161 | 3/1967 | Boughton | 350—35 |

FOREIGN PATENTS

| | | |
|---|---|---|
| 150,665 | 11/1961 | Russia. |
| 161,607 | 5/1933 | Switzerland. |
| 502,707 | 5/1920 | France. |

DAVID SCHONBERG, *Primary Examiner.*

P. R. GILLIAM, *Assistant Examiner.*

U.S. Cl. X.R.

350—76, 137, 139

UNITED STATES PATENT OFFICE
CERTIFICATE OF CORRECTION

Patent No. 3,434,772

March 25, 1969

Richard J. Fogle

It is certified that error appears in the above identified patent and that said Letters Patent are hereby corrected as shown below:

Column 6, line 11, "in a lateral straight-" should read -- located laterally within. --.

Signed and sealed this 31st day of March 1970.

(SEAL)

Attest:

Edward M. Fletcher, Jr.

Attesting Officer

WILLIAM E. SCHUYLER, JR.

Commissioner of Patents